US010603803B2

(12) United States Patent
Choi et al.

(10) Patent No.: US 10,603,803 B2
(45) Date of Patent: Mar. 31, 2020

(54) HUMANOID ROBOT FOOT COMPRISING AN ACTIVE VARIABLE STIFFNESS MECHANISM

(71) Applicants: FONDAZIONE ISTITUTO ITALIANO DI TECNOLOGIA, Genoa (IT); UNIVERSITÁ DEGLI STUDI DI GENOVA, Genoa (IT)

(72) Inventors: Wooseok Choi, Seoul (KR); Nikolaos G. Tsagarakis, Genoa (IT); Gustavo A. Medrano-Cerda, Swinton (GB); Darwin Gordon Caldwell, Serra Riccó (IT)

(73) Assignees: FONDAZIONE ISTITUTO ITALIANO DI TECNOLOGIA (IT); UNIVERSITA' DEGLI STUDI DI GENOVA (IT)

( * ) Notice: Subject to any disclaimer, the term of this patent is extended or adjusted under 35 U.S.C. 154(b) by 83 days.

(21) Appl. No.: 15/769,803

(22) PCT Filed: Oct. 20, 2016

(86) PCT No.: PCT/EP2016/075218
§ 371 (c)(1),
(2) Date: Apr. 20, 2018

(87) PCT Pub. No.: WO2017/068037
PCT Pub. Date: Apr. 27, 2017

(65) Prior Publication Data
US 2018/0311837 A1    Nov. 1, 2018

(30) Foreign Application Priority Data

Oct. 21, 2015  (IT) .......................... 102015000063795

(51) Int. Cl.
*B62D 57/032* (2006.01)
*B25J 19/06* (2006.01)
(Continued)

(52) U.S. Cl.
CPC ......... *B25J 19/068* (2013.01); *B25J 19/0016* (2013.01); *B25J 19/02* (2013.01); *B62D 57/032* (2013.01)

(58) Field of Classification Search
CPC ...... B25J 19/068; B25J 19/0016; B25J 19/02; B62D 57/032
(Continued)

(56) References Cited

U.S. PATENT DOCUMENTS 5,161,631 A * 11/1992 Urakami .................. B24C 3/06
180/164
2002/0088083 A1* 7/2002 Takizawa ................ B25J 5/007
16/45

(Continued)

FOREIGN PATENT DOCUMENTS

CN      103057620 A     4/2013
CN      103753064 A     4/2014

OTHER PUBLICATIONS

International Search Report for PCT/EP2016/075218 dated Mar. 2, 2017.
(Continued)

*Primary Examiner* — Kevin Hurley
*Assistant Examiner* — Felicia L. Brittman
(74) *Attorney, Agent, or Firm* — Thomas | Horstemeyer, LLP

(57) ABSTRACT

A humanoid robot foot (10) comprises: a foot base (12), at least one leaf spring (14) acting as a flexible toe of the foot, said at least one leaf spring (14) having a rear portion (14*a*) rigidly connected to a flat surface (12*b*) of the foot base (12),
(Continued)

a front portion (14*b*) projecting from the foot base (12) and an intermediate portion (14*c*) which is not rigidly connected to the foot base (12) and is therefore freely deflectable, along with the front portion (14*b*), as a result of the application of an external force on the front portion (14*b*), and a stiffness adjustment device (26) for actively changing the stiffness (K) of said at least one leaf spring (14). The stiffness adjustment device (26) comprises a roller assembly (28), which is held in contact with the intermediate portion (14*c*) of said at least one leaf spring (14) and is movable relative to said at least one leaf spring (14) along a longitudinal axis (x) of said at least one leaf spring (14), and an actuation unit (34) arranged to move the roller assembly (28), and hence the point of contact (P) of the roller assembly (28) with said at least one leaf spring (14), thereby varying the length (l) of the cantilevered portion of said at least one leaf spring (14), and hence the stiffness (K) of said at least one leaf spring (14).

10 Claims, 4 Drawing Sheets

(51) Int. Cl.
*B25J 19/00* (2006.01)
*B25J 19/02* (2006.01)

(58) Field of Classification Search
USPC .......................................................... 180/8.1
See application file for complete search history.

(56) References Cited

U.S. PATENT DOCUMENTS

2004/0064195 A1 4/2004 Herr
2010/0114329 A1* 5/2010 Casler ................. B25J 19/0008
623/24

OTHER PUBLICATIONS

Written Opinion for PCT/EP2016/075218 dated Mar. 2, 2017.
Jinying Zhu et al. "PANTOE 1: Biomechanical design of powered ankle-foot prosthesis with compliant joints and segmented foot", Adv. Intell. Mechatronics (AIM), 2010 IEEE/ASME Intl. Conf., Piscataway, NJ, USA, Jul. 6, 2010, pp. 31-36.
Vanerborght B et al. "Variable impedance actuators: A review", Robotics and Autonomous Sys., 2013; 61(12): 1601-1614.
Harn R et al. "Compliant actuator designs", IEEE Robotics & Automation Magazine, IEEE Service Center, Piscataway, NJ, USA, 2009; 16(3): 81-94.

* cited by examiner

HUMANOID ROBOT FOOT COMPRISING AN ACTIVE VARIABLE STIFFNESS MECHANISM

CROSS-REFERENCE TO RELATED APPLICATION

This application is the 35 U.S.C. § 371 national stage application of PCT Application No. PCT/EP2016/075218, filed Oct. 20, 2016, where the PCT claims priority to and the benefit of Italian Patent Application No. 102015000063795, filed on Oct. 21, 2015, both of which are herein incorporated by reference in their entireties.

The present invention relates in general to an active variable stiffness mechanism comprising at least one flexible member and a stiffness adjustment device arranged to actively adjust the stiffness of said at least one flexible member. More specifically, the present invention relates to a humanoid robot foot using such mechanism to adjust the stiffness of at least one flexible toe of the foot.

During last decade many humanoid robots have been developed with improved balancing and push recovery abilities, as well as with the capability of locomotion and running on irregular terrain. Most of these robots have employed simple flat rectangular feet using an elastic material as a foot sole. This foot design is very popular but makes it difficult to mimic human-like locomotion, particularly on uneven terrain. Furthermore, a large number of humanoid robots with gait based on the zero moment point principle and on the inverted pendulum principle have serious drawbacks in terms of locomotion on uneven terrain and excessive energy consumption due to large knee angles during the walking cycle.

In order to overcome some of these limitations, researchers have proposed feet provided with toes and have introduced stiffness in the feet design. For example, a flexible passive toe has been simply introduced by adding one joint and torsional springs controlling rotation of this joint. A foot for humanoid robot provided with a flexible passive toe of the above-mentioned type is disclosed for example in CN103057620.

Active variable stiffness mechanisms have already been developed, but these mechanisms are designed for rotational joints and are not suitable for use on relatively small humanoid robot feet. On the other hand, other known solutions use an active toe as an impedance regulator to improve balancing during the standing phase and when the humanoid robot starts or stops walking.

It is the object of the present invention to provide a mechanism which is able to actively adjust the stiffness of a flexible member and which is simple and compact so as to be suitable for use on humanoid robot feet.

This and other objects are fully achieved according to the present invention by virtue of a humanoid robot foot as defined in independent claim 1.

Advantageous embodiments of the present invention are the subject-matter of the dependent claims, the content of which is to be intended as forming an integral and integrating part of the following description.

In short, the invention is based on the idea of making the at least one flexible toe of the foot as a leaf spring having a rear portion rigidly connected to a flat surface of the foot base, a front portion projecting from the foot base and an intermediate portion which is not connected to the foot base and is therefore freely deflectable, along with the front portion, as a result of the application of an external force on the front portion, and providing a stiffness adjustment device comprising a roller assembly, which is held in contact with the intermediate portion of the at least one leaf spring and is movable relative to the at least one leaf spring, and an actuation unit arranged to move the roller assembly and hence the point of contact of the roller assembly with the at least one leaf spring, thereby varying the length of the cantilevered portion of the at least one leaf spring and hence the stiffness of the at least one leaf spring.

By changing the position of the roller assembly relative to the at least one leaf spring, it is possible to change the length of the cantilevered portion of the at least one leaf spring and hence the stiffness of the at least one leaf spring. This allows to actively control the stiffness of the flexible toe(s) of the foot, for example to change it depending on whether the robot is standing or walking or depending on the characteristics of the terrain on which the robot is walking.

Preferably, the at least one leaf spring is shaped such that its width at the contact point with the roller assembly varies depending on the position of the roller assembly. In this case, therefore, the stiffness of the at least one leaf spring depends on the position of the roller assembly not only because the spring length depends on the position of the roller assembly, but also because the spring width depends on the position of the roller assembly. By shaping for example the flexible toe in such a manner that the spring width increases as the spring length decreases, a larger range of stiffness values is obtained compared to the case where the spring width is constant.

Further features and advantages of the present invention will become apparent from the following detailed description, given purely by way of non-limiting example with reference to the appended drawings, where:

Figures 1, 2:
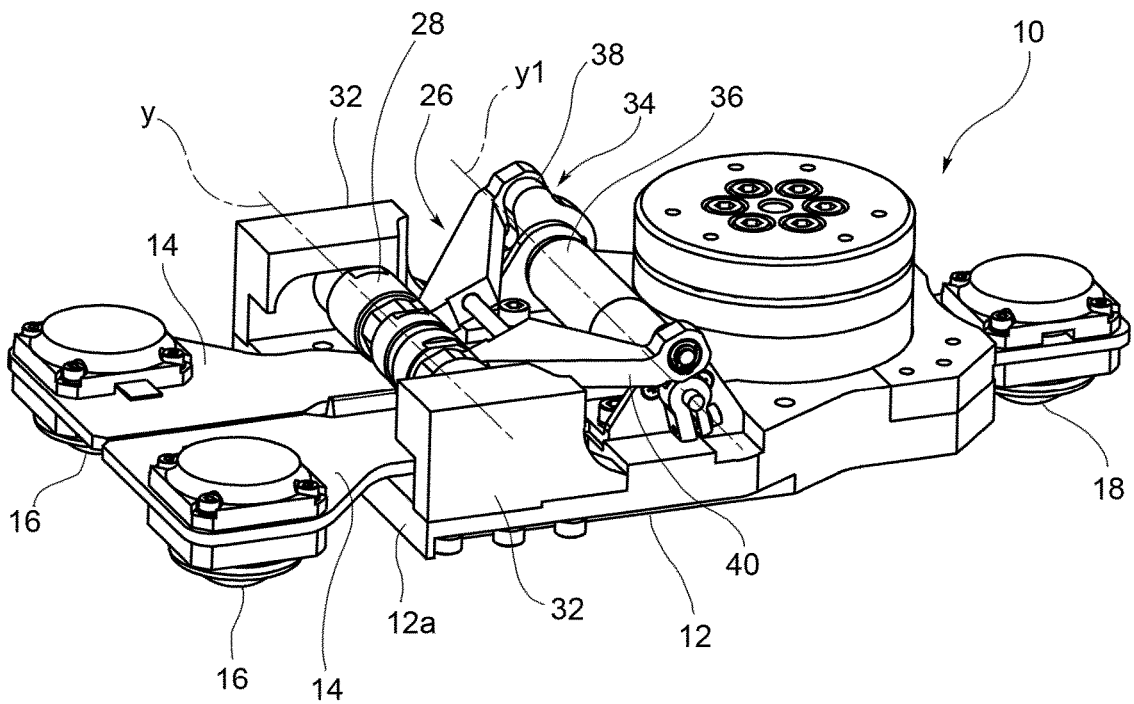
FIGS. 1 and 2 are perspective views, from above and from below, respectively, of a humanoid robot foot according to an embodiment of the present invention.
Figure 8:
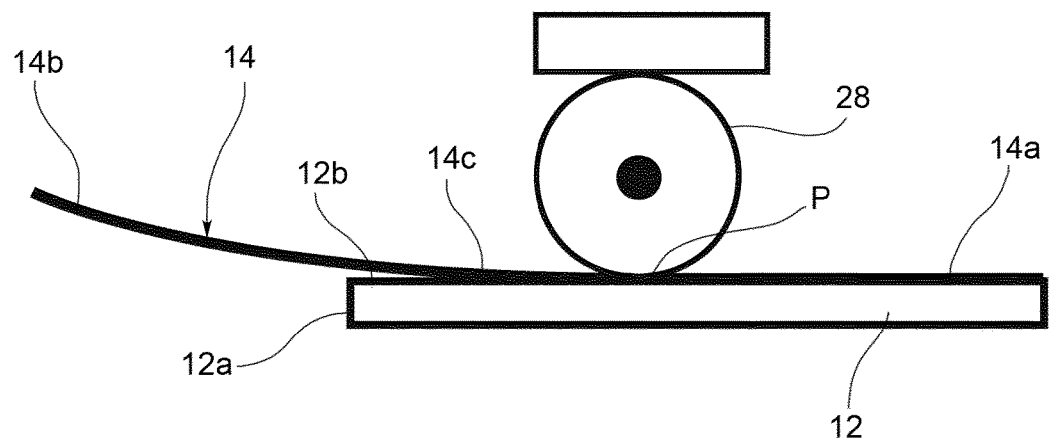
Figure 9:
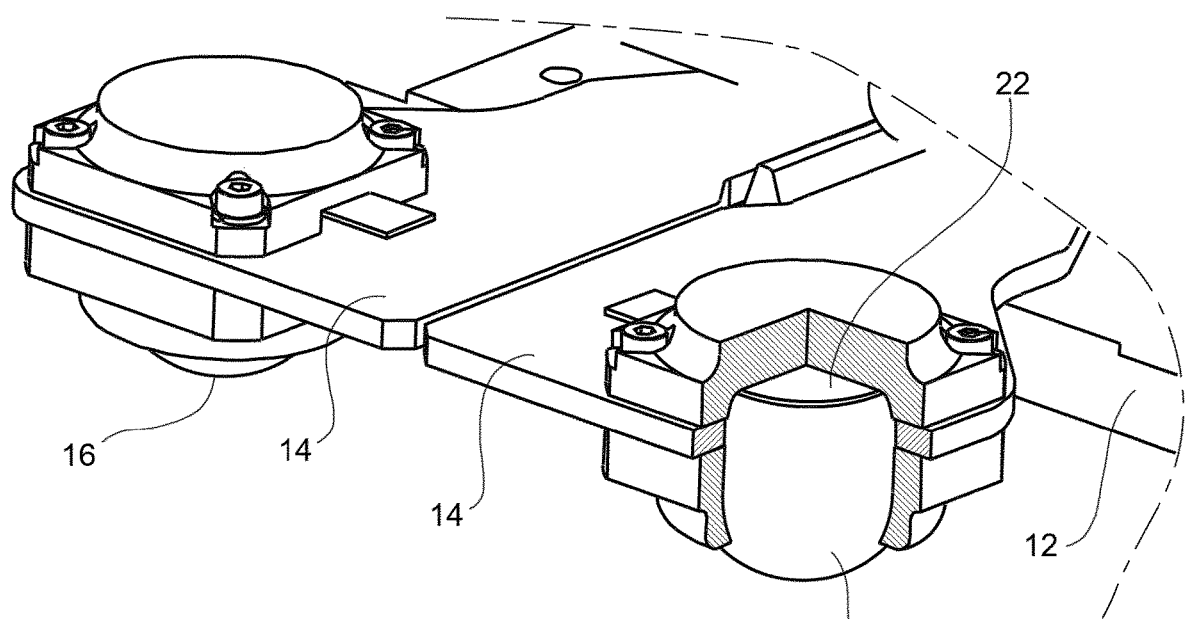

FIG. 8 schematically shows a flexible toe of the foot of FIGS. 1 and 2 in the deflected condition as a result of the application of an external force at the free end of the toe; and FIG. 9 is a perspective view showing in detail the two flexible toes (one partially cut away) of the foot of FIGS. 1 and 2.

With reference first to FIGS. 1 and 2, a foot for a humanoid robot is generally indicated 10. The foot 10 basically comprises a foot base 12 made as a rigid body and at least one leaf spring 14 (in the illustrated embodiment, two leaf springs) acting as flexible toes of the foot. The leaf springs 14 are attached with rear ends thereof to the foot base 12 and extend forwards from the latter in a cantilevered fashion. Each leaf spring 14 carries at a free end thereof a respective front contact member 16 for contact with the ground. A rear contact member 18 is also provided for and is attached to the rear end of the foot base 12.

As shown in FIG. 9, each of the front contact members 16 comprises a rubber ball 20 and a pressure sensor 22 for measuring the pressure applied to the rubber ball 20. The same applies to the rear contact member 18, which also comprises a rubber ball 24 (FIG. 2) and a pressure sensor (not shown) for measuring the pressure applied to the rubber ball 24.

Figure 3:
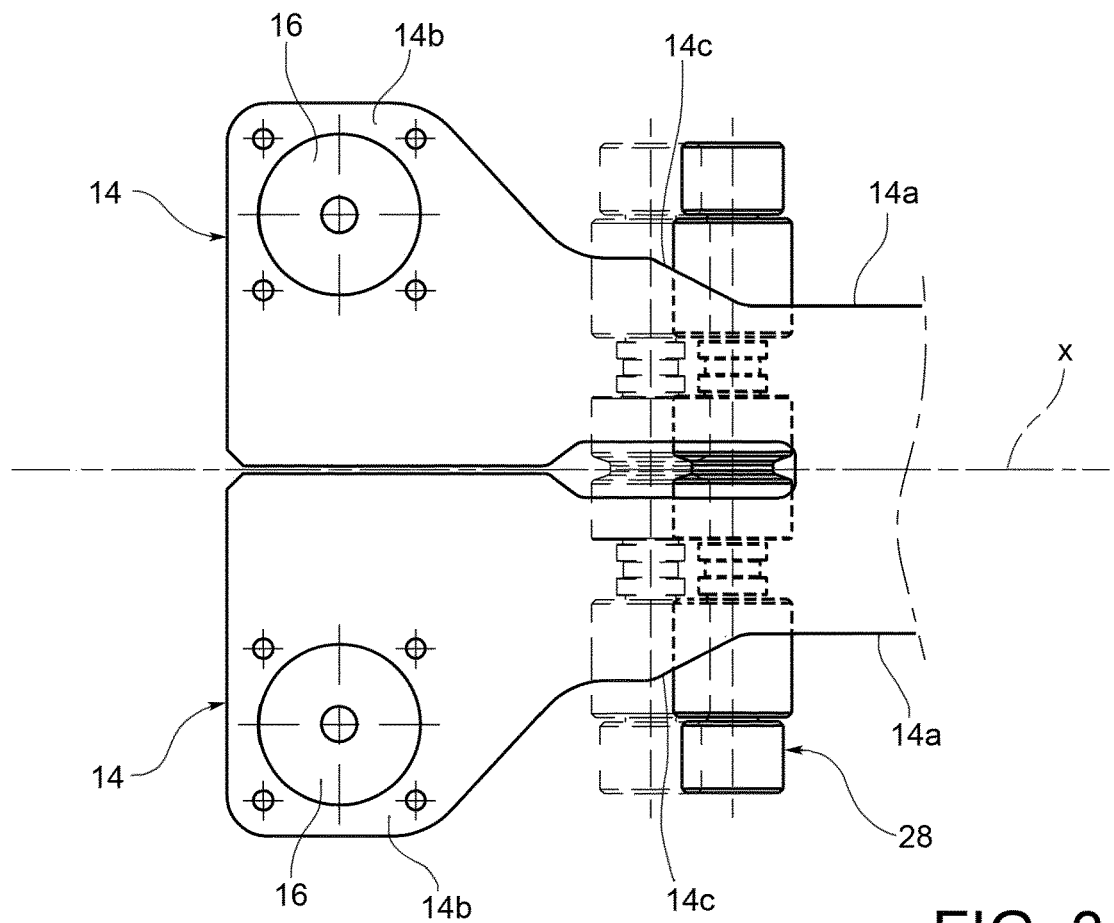
FIG. 3 is a plan view of the tow portion of the foot of FIGS. 1 and 2.

With reference in particular to FIG. 3, the leaf springs 14 are shaped and mounted symmetrically on the foot base 12 with respect to a longitudinal axis x of the foot 10. Each leaf spring 14 comprises a rear portion 14a rigidly connected to the foot base 12, a front portion 14b projecting from a front edge 12a of the foot base 12 and an intermediate portion 14c interposed between the rear portion 14a and the front portion 14b. The front contact members 16 are mounted on the front portions 14b of the respective leaf springs 14. As schematically shown in FIG. 8, the intermediate portion 14c extends above an upper flat surface 12b of the foot base 12 and is not attached to the foot base 12 so as to be free to deflect, along with the front portion 14b, as a result of the application of an external force F onto the respective leaf spring 14. The leaf springs 14 are deflectable independently of each other, which is particularly useful when the foot is placed on different surface levels. The leaf springs 14 are made for example of titanium, but may of course be made of any other suitable material.

The stiffness K of the leaf spring 14 is given by $$K = \frac{Ewt^3}{4l^3}, \quad (1)$$

where E is the Young's modulus of the material of the spring, w is the width of the spring, t is the thickness of the spring and l is the length of the cantilevered portion of the spring (measured from the point of application of the external force F), hereinafter simply referred to as "spring length".

The foot 10 further comprises a stiffness adjustment device, generally indicated 26, for actively adjusting the stiffness K of the leaf springs 14 by varying the spring length l.

Figure 4:
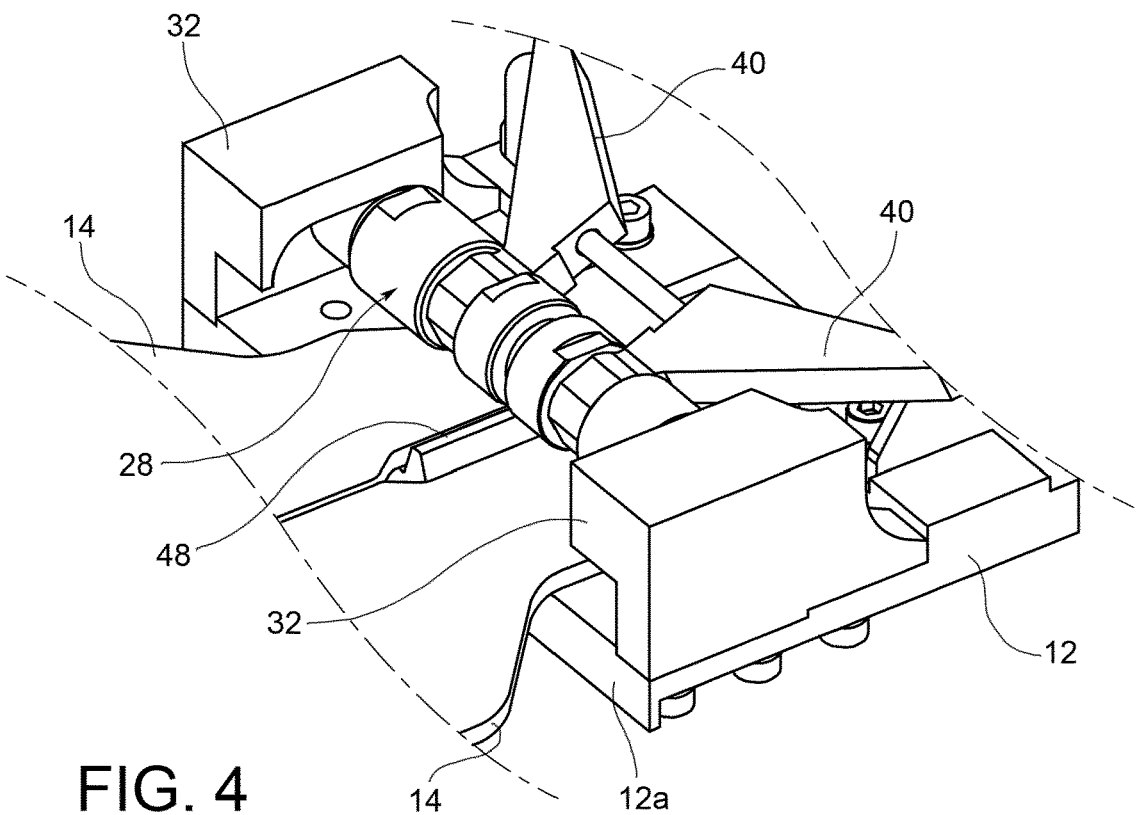
FIG. 4 is a perspective view showing a detail of a stiffness adjustment device of the foot of FIGS. 1 and 2.

The stiffness adjustment device 26 comprises first of all a roller assembly 28 which is held in contact with the leaf springs 14, in particular with the intermediate portions 14c thereof, so as to press the leaf springs 14 against the upper flat surface 12b of the foot base 12. The roller assembly 28 is freely rotatable about an axis of rotation y extending in the transverse direction, i.e. in a horizontal direction perpendicular to the longitudinal axis x. Moreover, the roller assembly 28 is movable in the longitudinal direction x relative to the leaf springs 14 so as to vary the point of contact P between the roller assembly 28 and the leaf springs 14. To this end, the roller assembly 28 is guided at its end portions by a pair of guide members 32 mounted on the foot base 12 (FIG. 4). As the roller assembly 28, and therefore its point of contact P with the leaf springs 14, moves in the longitudinal direction x, the spring length l also varies, thereby resulting in a change of the stiffness K of the springs 14 according to equation (1). Indicating s the longitudinal position of the point of contact P, with s=0 when the spring length l reaches its maximum value L and with $s=s_{max}$ when the spring length l reaches its minimum value (see FIG. 3), the spring length l is given by:

$$l(s)=L-s. \quad (2)$$

The stiffness adjustment device 26 further comprises an actuation unit 34 arranged to control the movement of the roller assembly 28 in the longitudinal direction x. In the proposed embodiment, the actuation unit 34 comprises a rotary actuator 36, for example an electric motor, and a crank mechanism arranged to convert the rotary motion generated by the rotary actuator 36 about an axis of rotation y1 parallel to the axis of rotation y of the roller assembly 28 into the translational motion of the roller assembly 28 along the longitudinal axis x. The crank mechanism comprises for example a pair of cranks 38, which are arranged to be driven by the rotary actuator 36 to rotate about the axis of rotation y1, and a pair of connecting rods 40, each of which is hinged at a first end thereof to a respective crank 38 and at the opposite end to the roller assembly 28.

Preferably, the leaf springs 14 are shaped in such a manner that their width at the point of contact P does not remain constant, but changes, as the point of contact P moves in the longitudinal direction x as a result of the movement of the roller assembly 28 controlled by the actuation unit 34. In such a case, therefore, the stiffness K of the leaf springs 14 changes with the longitudinal position s of the point of contact P not only because the spring length l changes, but also because the spring width w changes. In the proposed embodiment, each leaf spring 14 has an isosceles trapezoid shape in the portion where the point of contact P moves, whereby the spring width w linearly varies with the longitudinal position s of the point of contact P between a maximum value $w_1$ and a minimum value $w_2$ according to the following equation:

$$w(s) = w_2 + s\frac{w_1 - w_2}{s_{max}}. \quad (3)$$

In this case, therefore, the stiffness K of each leaf spring 14 varies with the longitudinal position s of the point of contact P as follows:

$$K(s) = \frac{E\left(w_2 + s\frac{w_1 - w_2}{s_{max}}\right)t^3}{4(L-s)^3}. \quad (4)$$

Since the spring width w increases with the longitudinal position s of the point of contact P, the rate of increase in the stiffness K is larger than would be the case with a constant spring width. A larger range of stiffness values is thus obtained compared to the case where the spring width is constant.

Naturally, other shapes of the leaf springs 14, and therefore other laws of variation of the stiffness K as a function of the longitudinal position s of the point of contact P, may be envisaged.

Figure 5:
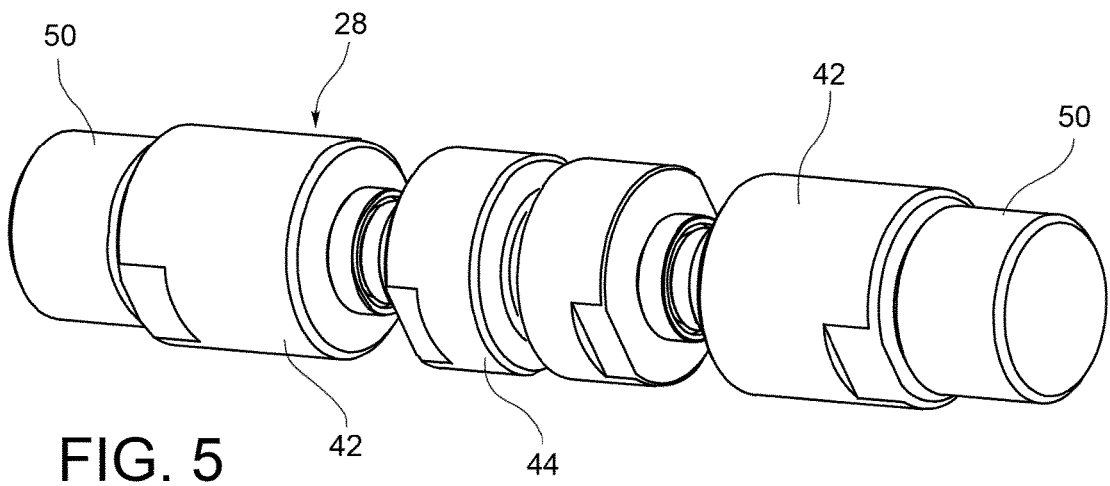
FIGS. 5 and 6 are a perspective view and a axial section view, respectively, of the roller assembly of the stiffness adjustment device of the foot of FIGS. 1 and 2.
Figure 6:
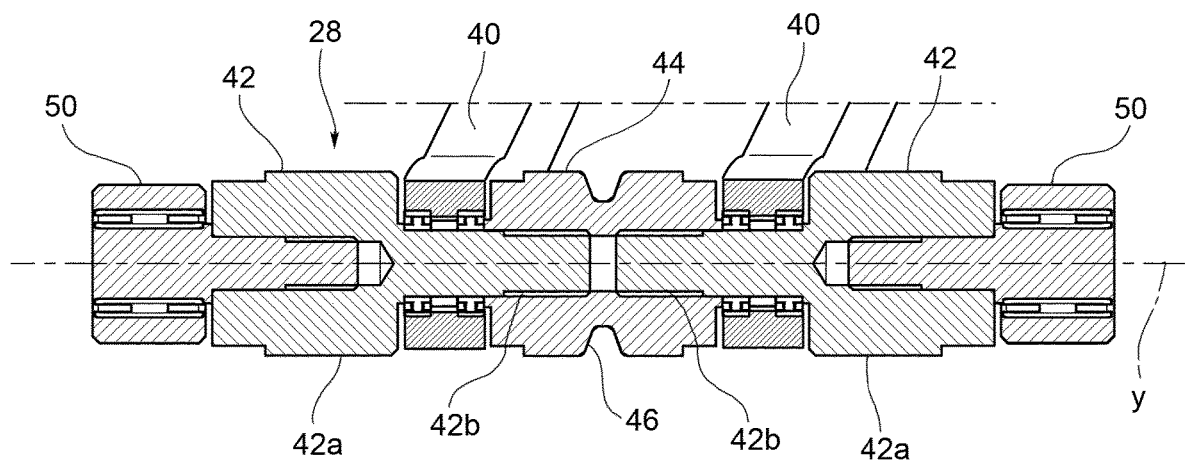
Figure 7:
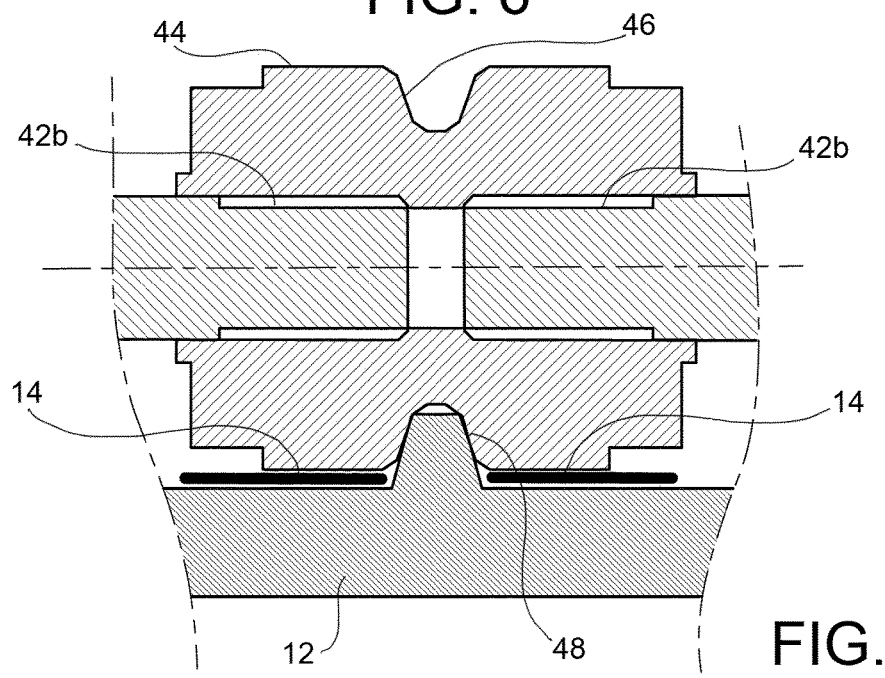
FIG. 7 is an axial section view showing how the roller assembly is constrained to a support base of the foot of FIGS. 1 and 2.

With reference now to FIGS. 5 to 7, the structure of the roller assembly 28 will be described in detail. According to the proposed embodiment, the roller assembly 28 comprises three rotating elements, namely two outer elements 42 and a middle element 44, which are rotatable independently of each other about the axis of rotation y. Providing separate rotating elements (in the present case, three elements) which rotate independently of each other about the same axis of rotation allows to minimize the frictional torques acting on the roller assembly 28. Preferably, each of the two outer elements 42 has a cylindrical body 42a in contact with its lateral surface on a respective leaf spring 14 and a shaft 42b projecting axially from the cylindrical body 42a. The two outer elements 42 are arranged with their shafts 42b facing each other, i.e. facing towards the centre of the roller assembly 28. The middle element 44 is made as a hollow cylindrical body which is rotatably supported on the shafts 42b of the two outer elements 42 and is in contact with its lateral surface on both the leaf springs 14. The middle element 44 has a circumferential groove 46 extending throughout the lateral surface of that element. In the groove 46 a protrusion 48 engages, which is formed by the foot base 12 and extends along the longitudinal axis x to mechanically constrain the roller assembly 28 to move along this axis. As can be seen in particular in FIG. 6, the connecting rods 40 of the crank mechanism of stiffness adjustment device 26 are hinged to the shafts 42b of the two outer elements 42 of the roller assembly 28. The roller assembly 28 further comprises a pair of cam followers 50 which are rotatably mounted at the outer ends of the two outer elements 42 and engage each with a respective one of the guide members 32 to ensure that the three rotating elements 42 and 44 of the roller assembly 28 are held in contact with the leaf springs 14.

As is clear from the above description, the present inventions provides a simple and compact mechanism for actively varying the stiffness of a flexible toe of a humanoid robot foot, thus allowing to change the stiffness of the flexible toes depending for example on the characteristics of the terrain and hence to improve the ability of the robot to walk on uneven terrains.

Naturally, the principle of the invention remaining unchanged, the embodiments and the constructional details may vary widely from those described and illustrated purely by way of non-limiting example, without thereby departing from the scope of the invention as defined in the appended claims.

For example, although the invention has been illustrated with reference in particular to its application to a humanoid robot foot, it is not, however, to be intended as limited to this specific application, but can be used in other applications where it is required to actively control the stiffness of at least one flexible member made as a leaf spring. Therefore, the invention also relates, in broader terms, to an active variable stiffness mechanism for actively changing the stiffness of at least one flexible member made as a leaf spring, wherein the at least one leaf spring is mounted on a support base of the mechanism and has a rear portion rigidly connected to a flat surface of the support base, a front portion projecting from the support base and an intermediate portion which is not rigidly connected to the support base and is therefore freely deflectable, along with the front portion, as a result of the application of an external force on the front portion, and wherein the mechanism further comprises a stiffness adjustment device including a roller assembly, which is held in contact with the intermediate portion of the at least one leaf spring and is movable relative to the at least one leaf spring along a longitudinal axis of the at least one leaf spring, and an actuation unit arranged to move the roller assembly, and hence the point of contact of the roller assembly with the at least one leaf spring, thereby varying the length of the cantilevered portion of the at least one leaf spring, and hence the stiffness of the at least one leaf spring. More specifically, the invention also relates to a mechanism of the above-mentioned type, wherein the intermediate portion of the at least one leaf spring is shaped such that its width at the point of contact with the roller assembly varies depending on the position of the roller assembly.

The invention claimed is:

1. A humanoid robot foot comprising:
a foot base,
at least one leaf spring acting as a flexible toe of the humanoid robot foot, said at least one leaf spring having a rear portion rigidly connected to a flat surface of the foot base, a front portion projecting from the foot base and an intermediate portion which is not rigidly connected to the foot base and is therefore freely deflectable, along with the front portion, as a result of an application of an external force on the front portion, and
a stiffness adjustment device for actively changing a stiffness of said at least one leaf spring,
wherein the stiffness adjustment device comprises a roller assembly, which is held in contact with the intermediate portion of said at least one leaf spring and is movable relative to said at least one leaf spring along a longitudinal axis of said at least one leaf spring, and an actuation unit arranged to move the roller assembly, and hence a point of contact of the roller assembly with said at least one leaf spring, thereby varying a length of a cantilevered portion of said at least one leaf spring, and hence the stiffness of said at least one leaf spring.

2. The humanoid robot foot according to claim 1, wherein the intermediate portion of said at least one leaf spring is shaped such that a width of the intermediate portion at the point of contact with the roller assembly varies depending on a position of the roller assembly.

3. The humanoid robot foot according to claim 2, wherein the width of the intermediate portion of said at least one leaf spring at the point of contact with the roller assembly varies linearly with the position of the roller assembl.

4. The humanoid robot foot feet according to claim 2, wherein the width of the intermediate portion of said at least one leaf spring at the point of contact with the roller assembly increases as a distance of the point of contact from the front portion of said at least one leaf spring decreases.

5. The humanoid robot foot according to claim 1, further comprising guide members engaging end portions of the roller assembly to guide the roller assembly along said longitudinal axis and hold the roller assembly in contact with the intermediate portion of said at least one leaf spring.

6. The humanoid robot foot according to claim 1, wherein the roller assembly is freely rotatable about an axis of rotation extending perpendicular to said longitudinal axis.

7. The humanoid robot foot according to claim 6, wherein the roller assembly comprises a plurality of rotating elements which are rotatable independently of each other about said axis of rotation.

8. The humanoid robot foot according to claim 6, where the actuation unit comprises a rotary actuator and a crank mechanism arranged to convert a rotary motion generated by the rotary actuator about an axis of rotation parallel to the axis of rotation of the roller assembly into a translational motion of the roller assembly along said longitudinal axis.

9. The humanoid robot foot according to claim 1, wherein said at least one leaf spring is provided, at its front portion, with a front ground contact member, and wherein the humanoid robot foot further comprises a rear ground contact member mounted on a rear end of the foot base.

10. The humanoid robot foot according to claim 9, wherein each of said front and rear ground contact members comprises a rubber ball and a pressure sensor for measuring a pressure applied to the rubber ball.

* * * * *